UNITED STATES PATENT OFFICE.

OTTO WOLFES, OF DARMSTADT, GERMANY.

N-HALOGENALKYL-C.C-DIALKYLBARBITURIC ACIDS AND PREPARATION OF THE SAME.

1,074,030.   Specification of Letters Patent.   Patented Sept. 23, 1913.

No Drawing. Original application filed December 13, 1912, Serial No. 736,628. Divided and this application filed May 28, 1913. Serial No. 770,502.

*To all whom it may concern:*

Be it known that I, OTTO WOLFES, a subject of the Emperor of Germany, and a resident of Darmstadt, in the Grand Duchy of Hesse-Darmstadt, German Empire, have invented certain new and useful Improvements in N-Halogenalkyl-C.C-Dialkylbarbituric Acids and Preparation of the Same, of which the following is a specification.

My invention relates to a method for the preparation of N-halogenalkyl-C.C-dialkylbarbituric acids of the general type:

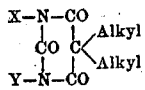

(X=halogenalkyl, Y=hydrogen or halogenalkyl) and consists in treating halogenalkyl derivatives of urea with dialkylmalonyl halogenids.

The present application is a divisional application from my application Serial Number 736628, filed December 13th, 1912, and which covered broadly the preparation of the above mentioned N-halongenalkyl-C.C-dialkylbarbituric acids.

My invention is shown by the following examples:

1. 13 parts of dibromopropyl urea of the formula Br.CH$_2$.CH(Br).CH$_2$.NH.CO.NH$_2$ (Rundquist, *Archiv der Pharmacie*, 236, 1898, page 456) and 10 parts of diethylmalonyl chlorid are heated to about 120° C. for 15 to 20 hours. The hydrogen chlorid is best removed by exhaustion in a vacuum. On cooling, the residue is dissolved in ether, and the reaction product is freed from acids by shaking with a solution of sodium bicarbonate. To completely purify it, it is removed from the ethereal solution by ice cold dilute solution of caustic potash, purified by animal charcoal, and again precipitated by slight acidification. The precipitate is then recrystallized from 70% alcohol. The product thus obtained proves to be in every respect identical with mono-N-dibromopropyl-C.C-diethylbarbituric acid. The normal course of the condensation of dibromopropyl urea with diethylmalonyl chlorid is somewhat surprising in view of the fact that Rundquist, in the paper alluded to above, draws special attention to the ready decomposition of dibromopropyl urea by acids.

2. To a solution of 14 parts of sinapolin (sym. diallyl urea) in 40 parts of benzol are added gradually, with stirring, 32 parts of bromin diluted with 40 parts of benzol, taking care to keep the mixture cool. The benzol is carefully removed by distillation in a vacuum. The residue is then heated with 20 parts of diethylmalonyl chlorid for 23 hours in a vacuum at 120° to 130° C. The reaction produced is dissovled in 100 parts of warm absolute alcohol, purified by the addition of animal charcoal, and cooled on ice; the alcohol is poured off and the viscid oil is boiled with petroleum ether (about 40° C.). The residue, insoluble in petrolether, is crystallized from alcohol. The product obtained, NN-tetrabromodipropyl-C.C-diethylbarbituric acid, forms small, colorless prisms, melting at about 64° C. On analysis it was found to contain 54.7% of bromin, whereas for C$_{14}$H$_{20}$O$_3$N$_2$Br$_4$ a content of 54.8% of bromin was calculated.

What I claim and desire to secure by Letters Patent is:

1. The method of producing N-halogenalkyl-C.C-dialkylbarbituric acids which consists in treating derivatives of halogenalkyl urea with dialkylmalonyl-halogenids.

2. The method of producing mono-N-halogenalkyl-C.C-dialkylbarbituric acids which consists in treating derivatives of mono-N-halogenalkyl urea with dialkylmalonylhalogenids.

3. The method of producing mono-N-bromoalkyl-C.C-dialkylbarbituric acids which consists in treating bromoderivatives of monoalkyl urea with dialkylmalonyl-halogenids.

4. The method of producing mono-N-dibromoalkyl-C.C-dialkylbarbituric acids which consists in treating dibromoderivatives of monoalkyl urea with dialkylmalonyl-chlorids.

5. The method of producing mono-N-dibromopropyl-C.C-diethylbarbituric acid which consists in treating dibromopropyl urea with diethylmalonylchlorid.

In testimony whereof I affix my signature in presence of two witnesses.

OTTO WOLFES.

Witnesses:
  JEAN GRUND,
  CARL GRUND.